A. H. HADLEY.
HOPPER FOR GRAIN DRILLS.
APPLICATION FILED DEC. 8, 1909.
964,245.
Patented July 12, 1910.
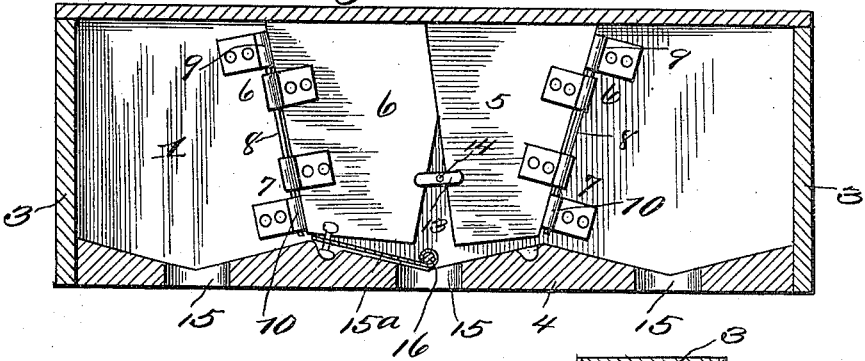
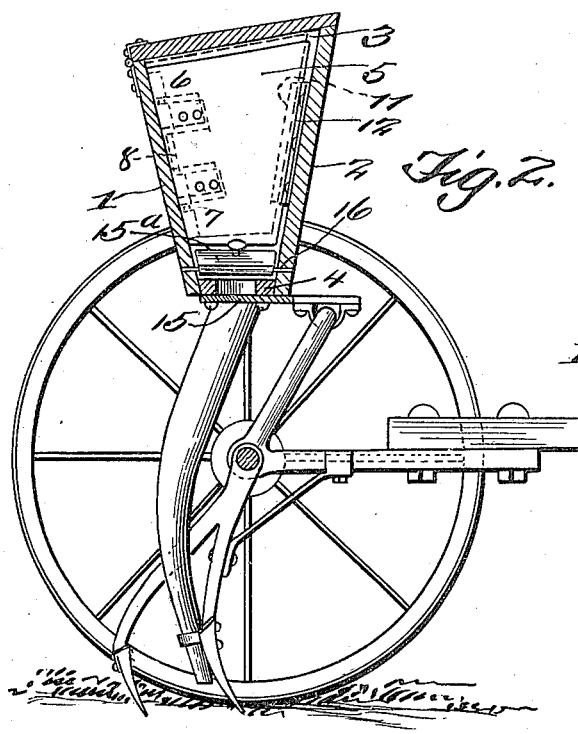
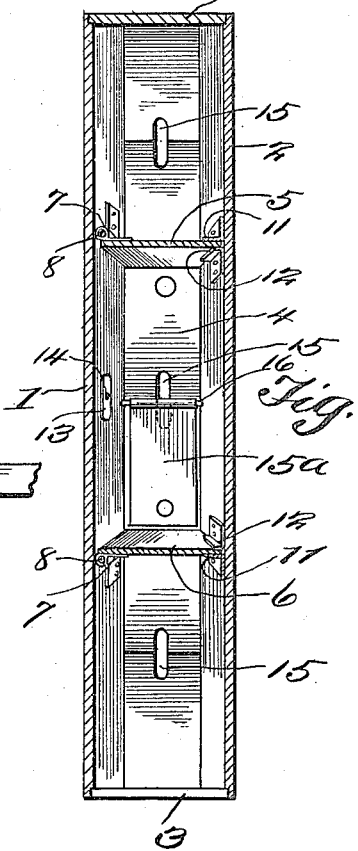
Witnesses
Francis G. Boswell
Marshall M. Miller
Inventor
Asher H. Hadley
By D. Swift &C.
Attorneys

UNITED STATES PATENT OFFICE.

ASHER H. HADLEY, OF FORESTVILLE, NEW YORK.

HOPPER FOR GRAIN-DRILLS.

964,245.    Specification of Letters Patent.    Patented July 12, 1910.

Application filed December 8, 1909. Serial No. 532,113.

*To all whom it may concern:*

Be it known that I, ASHER H. HADLEY, a citizen of the United States, residing at Forestville, in the county of Chautauqua and State of New York, have invented a new and useful Hopper for Grain-Drills; and I do hereby declare the following to be a full, clear, and exact description of the invention, such as will enable others skilled in the art to which it appertains to make and use the same.

The invention relates to improvements in hoppers and the particular object of the invention is to improve the construction of hoppers for grain drills.

One of the objects of the invention is to provide a hopper of the class described having a plurality of compartments by which two or more kinds of grain or two kinds of grain and fertilizer may be placed in separate compartments, said compartments being separated by foldable doors having improved means for locking said doors.

With these and other objects in view the invention consists in the novel construction and arrangement of parts hereinafter described and shown and particularly pointed out in the appended claims.

In the drawings:—Figure 1 is a horizontal vertical sectional view of a hopper for grain drills constructed in accordance with this invention. Fig. 2 is a longitudinal vertical sectional view taken through the hopper and shown applied to a planter or grain drill. Fig. 3 is a horizontal sectional view through the hopper, the same being shown detached from the drill.

Referring to the drawings:—1 and 2 designate the sides of my hopper which spread outwardly toward the top. The sides are connected together by end pieces 3 and a bottom piece or member 4. Between the two ends are two foldable partitions or doors 5 and 6, each of which doors is provided with an upper and lower hinge 6 and 7 which are mounted on a rod 8. The rod 8 is mounted in supporters 9 and 10.

It will be seen that the doors 5 and 6 have a limited vertical movement on the rod 8.

When the doors or partitions 5 and 6 are swung transversely of the hopper they are locked in that position between two L-shaped plates or locking members 11 and 12 mounted on the side 2 of the hopper. When it is desired to throw the compartments of the hopper all together, the doors 5 and 6 can be raised upwardly until they are free of the plates 11 and 12, when they can be thrown against the side 1 of the hopper and there locked by the pivotally locking member 13, which is mounted on a pivot 14.

Each compartment is provided with an aperture or opening 15 through which the contents of that compartment is dropped to the ground.

One of the openings 15 is shown provided with a pivoted door 15$^a$ which is mounted on a pivot 16, which is disposed transversely of the hopper. These doors may be placed across one or more of the openings in the bottom of the hopper.

Having thus described the invention what is claimed is:—

1. A hopper for grain drills comprising sides, partitions pivoted to one of said sides, the other side being provided with L-shaped plates adapted to lock one of the partitions transversely over said hopper.

2. A hopper for grain drills comprising sides, partitions pivoted to one of said sides, the other side being provided with L-shaped plates adapted to lock one of the partitions transversely in said hopper, said partition being adapted to be released from said locking plates when raised upwardly.

3. A hopper for grain drills comprising sides, partitions pivoted to one of said sides, the other side being provided with L-shaped plates adapted to lock one of the partitions transversely in said hopper, said partition being adapted to be released from said locking plates when raised upwardly and means for locking said partitions in an inoperative position.

In testimony whereof I have signed my name to this specification in the presence of two subscribing witnesses.

ASHER H. HADLEY.

Witnesses:
  CHAS. BIE,
  S. L. HURLBERT.